Jan. 12, 1943.   C. DE ROCHEFORT-LUCAY   2,308,060
MEANS FOR PRODUCING SIGNS IN SPACE
Filed May 14, 1940
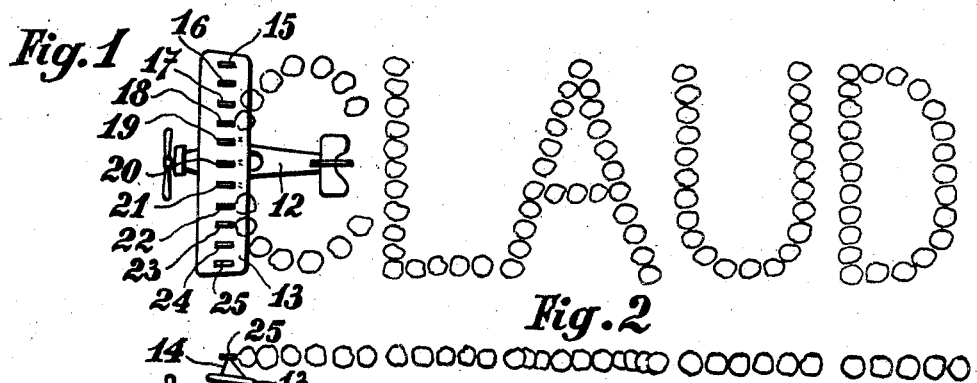
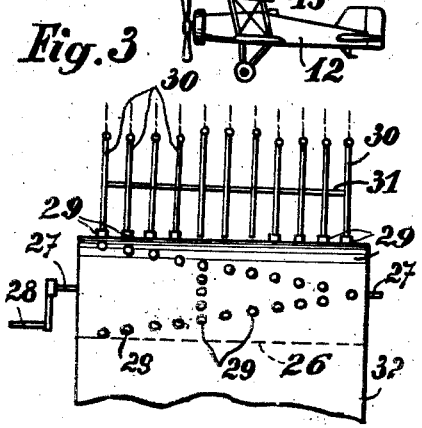
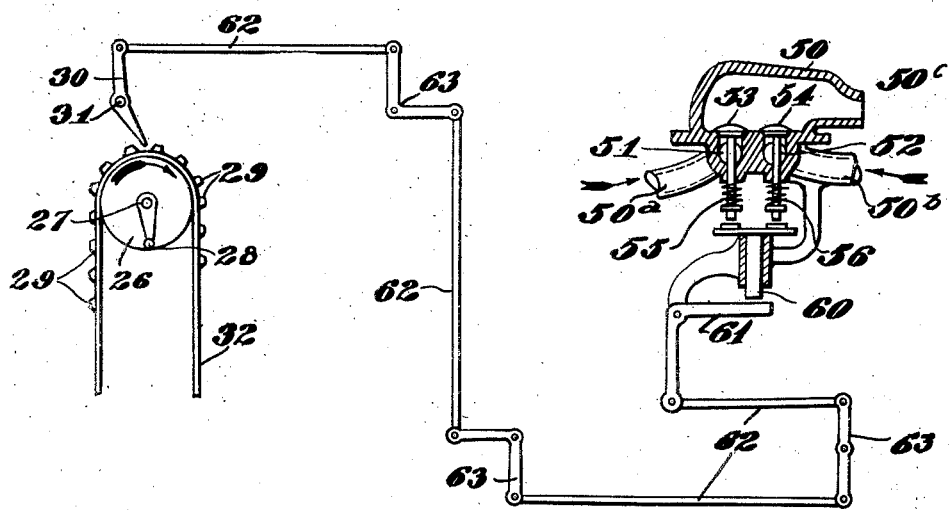
INVENTOR
C. de Rochefort-Luçay
BY H. B. Willson & Co.
ATTORNEYS Patented Jan. 12, 1943

2,308,060

UNITED STATES PATENT OFFICE 2,308,060

MEANS FOR PRODUCING SIGNS IN SPACE

Claude de Rochefort-Luçay, Buenos Aires, Argentina, assignor of one-third to Alfred Voelkle, Buenos Aires, Argentina Application May 14, 1940, Serial No. 335,189
In Belgium June 13, 1939

3 Claims. (Cl. 40—127.1)

The invention aims to provide a novel and effective mechanism for writing signs in the air by means of visible puffs of mixed gases discharged from gas-mixing casings disposed in a transverse row on an aircraft.

In the accompanying drawing:

Figure 1 is a top plan view of an aeroplane in the act of producing signs in accordance with the invention.

Fig. 2 is a side elevation of Fig. 1.

Fig. 3 is an elevation of part of the mechanical means for controlling the valves which effect mixing and discharge of the gases.

Fig. 4 is a side view of the mechanism shown in Fig. 3 operatively connected with one of the gas-mixing casings and its valves.

Referring to Figs. 1 and 2, a biplane 12 has been shown, provided on its upper plane 13 with a support 14 on which are affixed a plurality of smoke-mixing and discharging casings, all of which are constructed in the same manner as the casing 50 in Fig. 4, but for explanatory purposes, said casings are given the numbers 15 to 25 inclusive in Figs. 1 and 2.

Each casing 50 is provided with two gas inlets 50ᵃ and 50ᵇ, and with a mixed gas outlet 50ᶜ, and independent valves 53 and 54 are provided for said inlets, said valves having springs 55 and 56 for normally closing them. The inlets 50ᵃ and 50ᵇ lead from suitable tanks containing two gases under pressure, said gases being of such nature that when they are mixed, they will form a visible gas. When the valves 53 and 54 of any casing are simultaneously opened, the two gases enter said casing, mix therein and discharge in a puff through the outlet 50ᶜ.

The aircraft 12, in its flight, has successively written the letters D, U, A, L, and is finishing the writing of the letter C. This letter C has been written by opening at the same time and for a very short lapse of time, the valves of the casings 17 and 23, then 16 and 24, then 15 and 25, then 16 and 24, then 17 and 23, and then 18 and 22. Remaining to be opened, to complete the operation, are the valves of the casings 19 and 21, and 20, which may be opened simultaneously or in succession, beginning with those of 19 and 21 simultaneously.

To form the letter L, the valves of casing 25 have been opened four times, and then the valves of all casings 15 to 25 opened once simultaneously.

To form the letter A, the valves of all of the casings 25 to 15 have been successively opened in this order, repeating three times the opening of the valves of casing 20, and successively opening the valves of all of the casings 16 to 25 in this order.

The letters U and D have been formed in ways which will be obvious from the above.

Figure 1, being a view from above, the letters "CLAUD" are legible to an observer from a position above the aircraft. It suffices to consider Figure 1 as a view seen from below, to understand that the letters "CLAUD" can be produced in such a way as to be legible to an observer situated below the aircraft, on the ground, for example.

By grouping the opening controls of the valves, a species of keyboard may be formed, if desired, allowing the manual control of the emitted puffs of smoke or of vapors. Regardless of how the emission of puffs is controlled, these puffs are emitted from points on the aircraft spaced apart transversely of the line of flight and the emission of puffs is so controlled that said puffs will jointly form the desired signs.

In Figures 3 and 4, a roller 26 rotatable on suitable spindles 27, is operable by means of a handle 28. This roller forms part of guiding means for and serves to drive a belt 32 which has cam-like projections 29 which form the letter A to be produced. These projections 29 correspond to the eleven levers 30 which operate the eleven pairs of valves of the casings 15 to 25. These levers 30 oscillate on a fulcrum 31 and each opens the corresponding pair of valves of a casing 15 to 25 every time it is operated by a protuberance 29. It will be understood that the opening of the valves brought about by the projections 29 forming the letter A, will produce in space a letter A made up of as many puffs of mixed gases as there are projections. One continuous cam-like projection could of course be employed instead of a plurality of spaced projections to form the desired letter or the like.

For operatively connecting each lever 30 with the pair of valves 53 and 54 of the corresponding casing 50, I show a suitably mounted plunger 60 and an operating bell crank 61 for said plunger, together with a series of connected rods 62 and levers 63 connecting said bell crank 61 with said lever 30. Each time a projection or cam 29 on the belt 32 tilts the lever 30, the operating connections simultaneously open both valves 53 and 54, admitting the two gases to the casing 50. In this casing, the gases mix and form a visible gas which discharges through the outlet 50ᶜ in a puff. As soon as the projection or cam 29 clears the lever 30, the springs 55 and 56 close the valves and return the operating connections and lever 30 to their normal positions.

Insofar as the two gases are concerned, any gases which will form a visible gas when mixed, will suffice. For example, ammonia may be the one gas and sulphurous anhydride, the other.

What is claimed is:

1. In a mechanism for writing a sign by means of visible puffs of mixed gases discharged from an aircraft; a transverse row of gas-mixing casings on the aircraft, each of said casings having two gas inlets, a mixed gas outlet and two spring-closed valves for said inlets respectively; valve-operating mechanisms allotted one to each of said casings, said valve-operating mechanisms having individual actuating elements, the valve-operating mechanism allotted to each casing being operative to simultaneously open both valves of said casing when its actuating element is actuated, and master actuating means cooperatively related with said actuating elements for actuating said actuating elements independently in proper sequence to cause the mixed-gas puffs discharged from said casings to produce the desired sign.

2. In a mechanism for writing a sign by means of visible puffs of mixed gases discharged from an aircraft; a transverse row of gas-mixing casings on the aircraft, each of said casings having two gas inlets, a mixed gas outlet and two spring-closed valves for said inlets respectively; a row of levers corresponding in number to said casings, operating connections from said levers to said valves arranged to cause operation of any lever to simultaneously open both valves of the corresponding casing, and means for operating said levers in proper sequence to produce the desired sign by means of the mixed-gas puffs discharged from said casings.

3. In a mechanism for writing a sign by means of visible puffs of mixed gases discharged from an aircraft; a transverse row of gas-mixing casings on the aircraft, each of said casings having two gas inlets, a mixed gas outlet and two spring-closed valves for said inlets respectively; a row of levers corresponding in number to said casings, operating connections from said levers to said valves arranged to cause operation of any lever to simultaneously open both valves of the corresponding casing, and a belt having cams for operating said levers in the proper sequence to produce the desired sign by means of the mixed-gas puffs discharged from said casings.

CLAUDE DE ROCHEFORT-LUÇAY.